Figure 2:
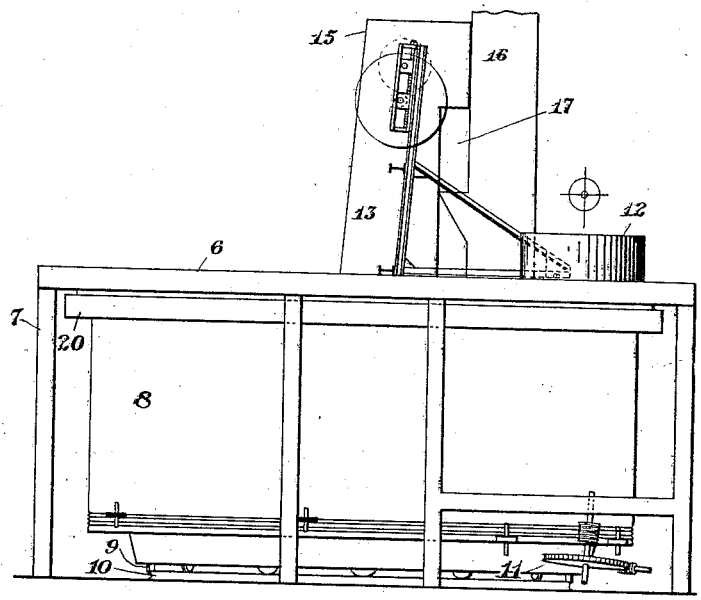

R. E. FORBIS.
ACID PHOSPHATE APPARATUS.
APPLICATION FILED MAR. 4, 1919.

1,318,063.

Patented Oct. 7, 1919.
3 SHEETS—SHEET 1.

Inventor
Rufus E. Forbis
By
Attorney

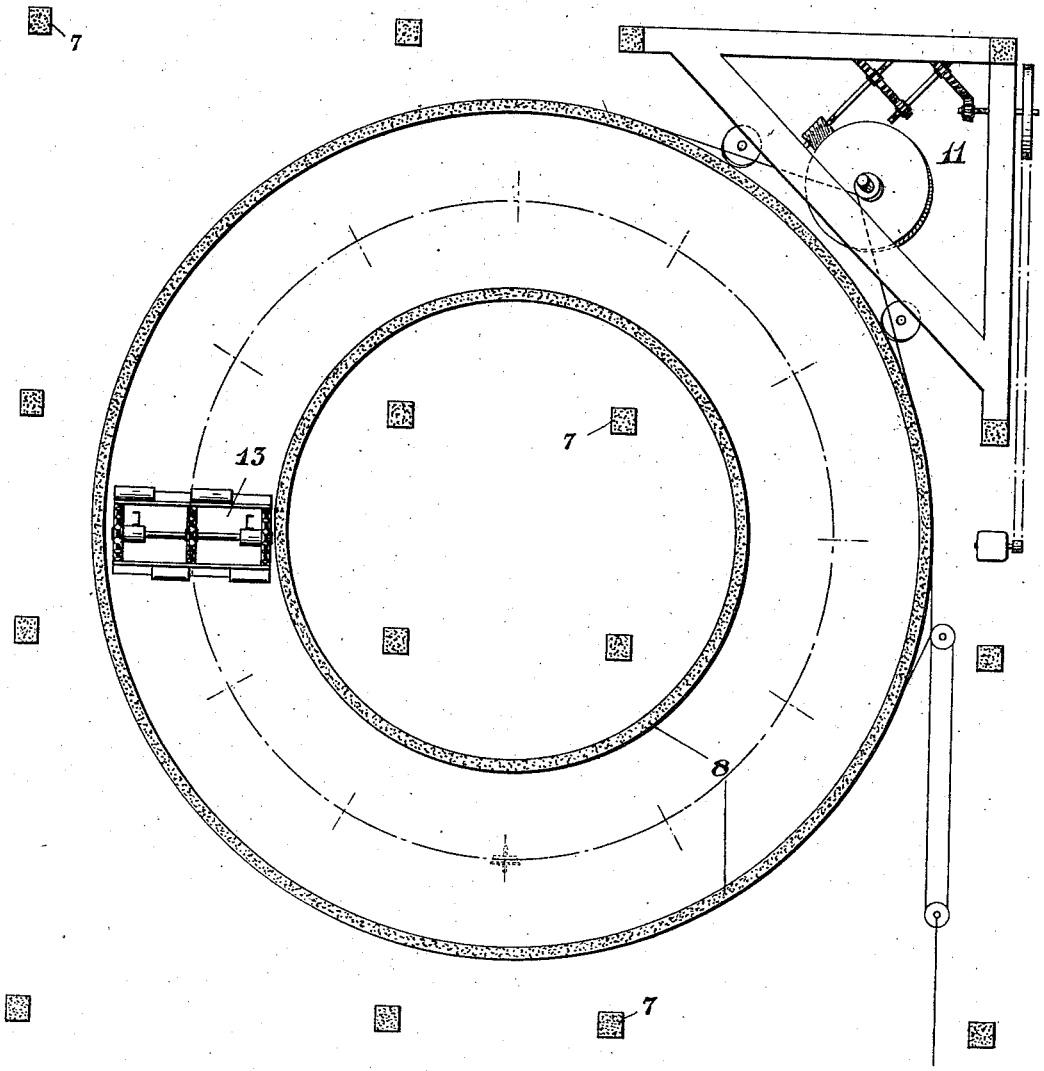

R. E. FORBIS.
ACID PHOSPHATE APPARATUS.
APPLICATION FILED MAR. 4, 1919.

1,318,063.

Patented Oct. 7, 1919.
3 SHEETS—SHEET 3.

Inventor
Rufus E. Forbis
By
Attorney

//UNITED STATES PATENT OFFICE.

RUFUS E. FORBIS, OF CHARLOTTE, NORTH CAROLINA, ASSIGNOR TO CHEMICAL CONSTRUCTION COMPANY, OF CHARLOTTE, NORTH CAROLINA, A CORPORATION.

ACID-PHOSPHATE APPARATUS.

1,318,063.  Specification of Letters Patent.  Patented Oct. 7, 1919.

Application filed March 4, 1919. Serial No. 280,525.

*To all whom it may concern:*

Be it known that I, RUFUS E. FORBIS, a citizen of the United States, residing at Charlotte, in the county of Mecklenburg and State of North Carolina, have invented certain new and useful Improvements in Acid-Phosphate Apparatus, of which the following is a specification.

This invention relates particularly to the manufacture of acid phosphate, but is capable of use on other materials if desired. The common method of making phosphate is as follows:

The ground phosphate rock is mixed with sulfuric acid in certain quantities in a mechanical mixer, and is then dumped into a rectangular den. Usually there are two dens; the acid phosphate being mixed on one day and emptied the next, and so on. As the acid phosphate leaves the mixer it is as a heavy hot liquid, vapors and gases being given off, and these are drawn off by ventilators or by a fan. The acid phosphate is allowed to stay in the den long enough to solidify and to complete the chemical reaction before being removed, so as to put it in a condition that it can be handled. The den is usually sealed during this period of conditioning, so as to keep the heat of the reaction, as it assists the drying out of the acid phosphate and the chemical reactions. The material has heretofore been removed in a number of ways, occasionally by wheelbarrows, where it is delivered to an elevator which in turn delivers it to a dump car for removal to storage piles. In many cases there are conveyers under the dens connected to an elevator, men going in and pulling the acid phosphate to the conveyers so that the acid phosphate can be discharged from the bottom. Again, an electric shovel goes into the dens and puts the acid phosphate on to the conveyer under the dens, other mechanical methods being used.

The great drawback in discharging the den is that the gases and vapor given off are very disagreeable, not only being hard on the men employed, but on any equipment, and it is often difficult to get labor to do this work.

The less the acid phosphate is handled the better the condition of the acid phosphate, hence any apparatus that enables the acid phosphate to be made so that it can be produced cheaply and without much handling is advantageous. A duplicate den requires duplicate mixers, hoppers and weighing apparatus, etc.

One object of the present invention is to do away with the duplicate den system, and make a continuous den system. In place of the rectangular dens there is used a circular revolving den, this den being large enough to hold the day's mixing in three-fourths of the den, leaving the other fourth empty. The mixer discharges the thick liquid acid phosphate into the den at one point, and as the den revolves very slowly the acid phosphate begins to set before it reaches the discharge point, which is distant three-quarters of the circumference of the den. By the time it reaches the discharge point the acid phosphate is conditioned ready to be taken out. The den can be operated so that the acid phosphate can be taken out the following day.

The mechanical arrangements are such that the speed of the den can be varied to suit any condition by use of a variable speed motor, or change gears. Also the den can be reversed at any time, so that it is perfectly flexible, and the acid phosphate can remain to condition as long as it is desired.

The acid phosphate is removed at a given point by an elevator of suitable width on which is operated a knife cutter of any suitable form, such as a steel knife, or a wire, so that the knife shaves the acid phosphate in thin layers, averaging an eighth to a quarter of an inch thick as desired. The material is dropped into the elevator buckets so that it is removed in good condition with the least possible handling. Other means of removing the acid phosphate could be used.

The den is revolved by a cable (such as drive of a merry-go-round), or in any other way desired, it being arranged so as to vary the travel and reverse it.

Figure 1:
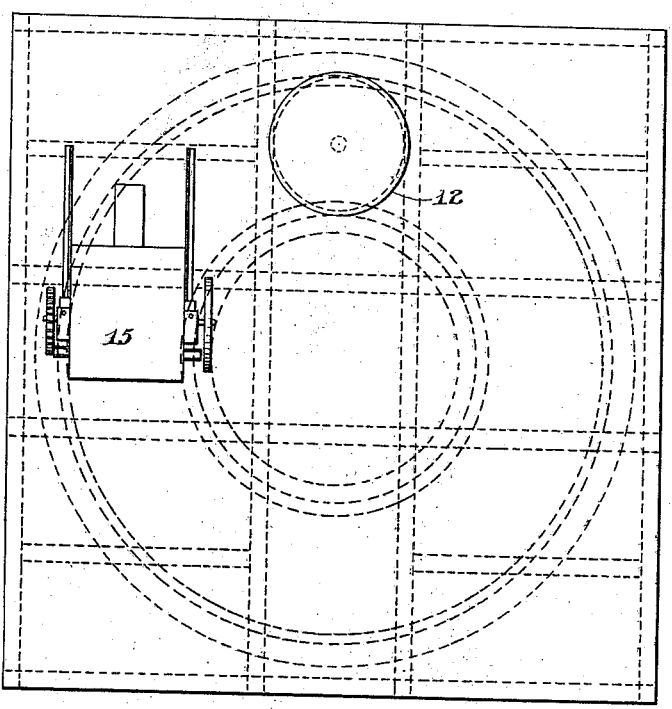
Figure 5:
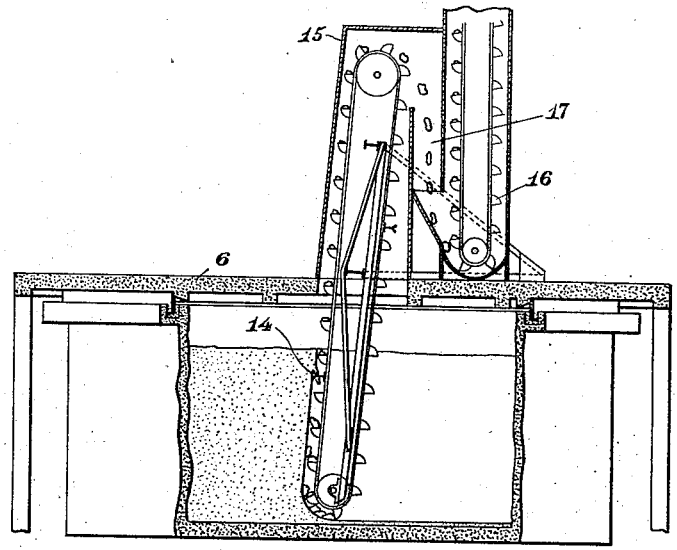
Figure 4:
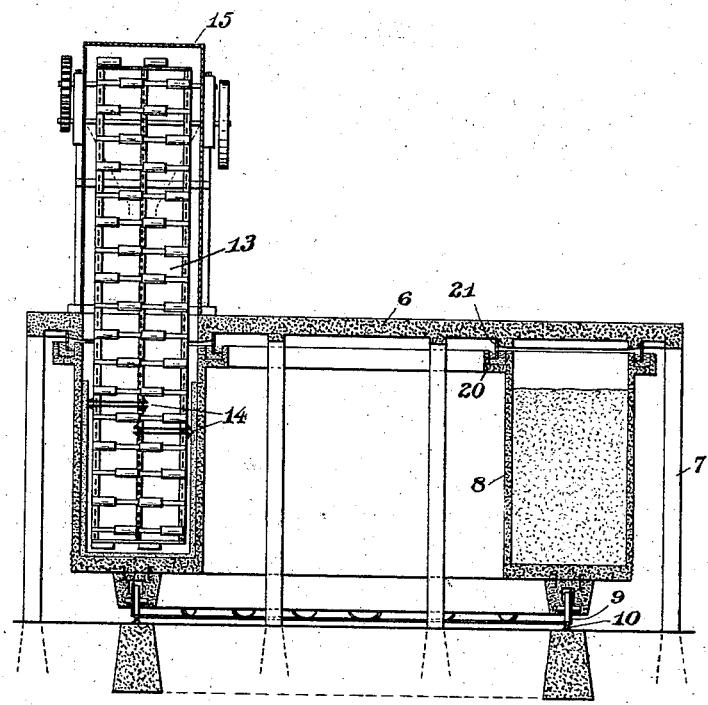

The den is constructed of any suitable material, steel lined, or reinforced concrete. It sits on a circular track. The top is stationary and is perfectly gas tight; or it can be carried on the den itself by sitting on rails attached to the top of the den, and still remain stationary. The gases may be drawn out from the top by a fan or ventilator. The den is perfectly tight and the troubles due to false covers and den doors are completely overcome. The elevator is inclosed, but it is free from gas and easily got at. One form of the invention is shown in the accompanying drawings, in which Figure 1 is a plan of the apparatus; Fig. 2 is a side elevation thereof; Fig. 3 is a horizontal section; Fig. 4 is a central vertical section; Fig. 5 is a vertical section through the elevator.

In the drawings, 6 indicates a top or platform supported by columns 7 at a suitable height above ground. Or this platform may be at the ground level and the parts thereunder set in a pit. The den comprises an annular trough or chamber 8 of sufficient size, say to hold tons of material. It is supported by rollers 9 which travel on a circular track 10, and it may be turned by any suitable means, such for example as a cable driving mechanism 11.

At one point over the den the platform supports a mixer 12 from which the mixture may be discharged into the den through an opening in the platform. At another point, preferably about three-fourths the way around, the platform supports an elevator 13, the excavating and elevating devices of which extend through an opening in the platform and into the den. Any suitable form of elevator may be used. I have shown one of the chain and bucket type, extending across almost the full width of the den so as to effectively empty the same. The chains carry cutters 14 which slice off the material and it drops into the bucket below. The elevator is covered by a housing 15 to confine the gas and may be driven by any suitable power applied in the ordinary manner. It may discharge into another elevator 16, through a chute 17 which traps the gas. And finally it may be discharged onto conveyers or other suitable transportation devices.

The inner and outer rims of the den are luted by troughs 20 containing tar, or the like, into which circular flanges 21 dip, these flanges being fixed to the under side of the platform.

In operation, as referred to above, the fresh mixture is fed from the mixer into the den at one point and is slowly carried around by the revolution of the den to the point of discharge where it is excavated and hoisted by the elevator and discharged, the speed of revolution being slow enough to insure the proper conditioning of the material. It will be seen that the material is inclosed and confined, and no gas can escape during the operation. Manual operations are unnecessary and the workmen are not exposed to the fumes.

I claim:

1. An apparatus of the kind described, comprising a closed revoluble chamber into which material may be deposited at one point, and a relatively stationary elevating excavator operating in said chamber at another point and adapted to remove the material therefrom.

2. An apparatus of the kind described, comprising a revoluble chamber, a fixed cover thereover, provided at one point with means whereby material may be deposited in said chamber and an elevator mounted on said cover at another point, and extending into said chamber to remove material therefrom.

3. An apparatus of the kind described, comprising a top platform, a revoluble annular container thereunder, seals between the rims of the container and the platform, and an elevator mounted on the platform and depending through the same into the container, to remove material therefrom.

4. An apparatus of the kind described, comprising a top, an annular chamber thereunder, one of said parts being fixed and the other revoluble relatively thereto, means to deposit material into said chamber, and an elevator mounted on the top and depending into said chamber to remove material therefrom.

5. An apparatus of the kind described, comprising a fixed cover, a revoluble closed annular chamber thereunder, and an elevating excavator mounted on the cover and depending through the same into said chamber and extending across the same between the side walls thereof.

6. An apparatus of the kind described, comprising a fixed cover, a revoluble closed annular trough-shaped chamber thereunder having side walls and a bottom, and an elevating excavator supported on the cover and depending into the chamber adjacent to the bottom and side walls thereof.

In testimony whereof, I affix my signature in presence of two witnesses.

RUFUS E. FORBIS.

Witnesses:
SLOAN S. SHERRILL,
GEO. L. SIBLEY.